United States Patent
Guyot

[11] 3,863,683
[45] Feb. 4, 1975

[54] TIRE CORD FOR PNEUMATIC TIRES AND PNEUMATIC TIRES CONTAINING THE SAME

[75] Inventor: Raymond Guyot, Paris, France

[73] Assignee: Compagnie Industrielle de Textiles Artificiels et Syntheliques, Paris, France

[22] Filed: Sept. 10, 1970

[21] Appl. No.: 71,250

Related U.S. Application Data

[63] Continuation of Ser. No. 777,128, Nov. 19, 1968, abandoned, which is a continuation-in-part of Ser. No. 396,308, Sept. 14, 1964, abandoned.

[52] U.S. Cl............................................. 139/426 R
[51] Int. Cl............................................. D03d 15/00
[58] Field of Search ............. 139/420, 426; 57/144; 161/90, 91

[56] References Cited
UNITED STATES PATENTS

| | | | |
|---|---|---|---|
| 1,756,069 | 4/1930 | Sawyer | 139/420 |
| 2,151,186 | 3/1939 | Chadwick | 139/420 |
| 3,169,557 | 2/1965 | Holland et al. | 139/426 |

*Primary Examiner*—Henry S. Jaudon
*Attorney, Agent, or Firm*—Sherman & Shalloway

[57] ABSTRACT

A process for producing cords for pneumatic tires, such cords so produced and pneumatic tires containing same, such process comprising preparing a woven sheet of equidistant cords by weaving such cords as the warp with a composite weft thread composed of a core yarn of low mechanical strength, said cord yarn having a helically wound cover yarn of a length such that during warping, dipping, or drawing of the sheet of cords the cover yarn stretches whereby the increased length of the cover yarn is equal to that which is necessary to maintain the warp cords in a parallel equidistant relationship. The core yarn is of such sufficiently low mechanical strength that it will break during the manipulative steps of tire production.

5 Claims, 4 Drawing Figures

TIRE CORD FOR PNEUMATIC TIRES AND PNEUMATIC TIRES CONTAINING THE SAME

This application is a continuation of copending patent application Ser. No. 777,128 filed Dec. 19, 1968 which is a continuation-in-part of copending application Ser. No. 396,308 filed Sept. 14, 1964 both now abandoned.

The present invention is directed to a method of preparing woven sheets of cords for pneumatic tires, such cords so produced and pneumatic tires containing the same; more particularly the present invention is directed to such process, product, and article wherein the cords are equidistant from one another.

In sheets of cords intended for use in the bodies of pneumatic tires and similar products for use in automobiles and other land and air vehicles it is extremely important that the cords constituting the sheets must remain in a precisely parallel arrangement and must maintain their spacing during the treatment and manipulative steps to which the cords are subjected during the manufacturing operations in the production of the tires and similar rubber articles. Accordingly, the means or method of maintaining such cords in such a parallel equidistant relationship has been a great problem in tire manufacturing.

Thus, where the cords are not yet clothed in rubber by a calendering operation there is a substantial risk that the cords may move apart or bunch up, such movement of the cords, of course, being extremely undesirable in the production of a uniform product, thereby making the avoidance of such movement necessary.

Prior to the development of the present invention there have been two main procedures for providing equidistant parallel cords and eliminating the tendency of the cords to move apart or bunch up during further processing and mechanical manipulation during tire production.

In the first of these procedures, the sheets are prepared from individual cords from individual reels which are brought directly to the rubber-covering calender, the cords being maintained parallel prior to the rubber-covering calendering by a suitable mechanical means. While such a process does satisfactorily provide a sheet of cords wherein the cords are spaced in a parallel equidistant manner such a process has certain inherent disadvantages and deficiencies which make the same undesirable for most applications.

Thus, for example, the above-described method is not completely satisfactory except for large scale production since such method does not permit the easy changing of one quality to another. Accordingly, for most applications wherein such ease of changing quality is necessary the first method as described above cannot be utilized. In addition, since it is necessary in accordance with the above-described method to carry out special treatments of the artificial or synthetic material so that they adhere readily to the rubber coating this leads to complicated and expensive installations thereby making the above-described process uneconomical for most purposes.

The second method employs woven sheets. The parallel lie of the cords, arranged along the warp of the fabric, is ensured by placing weft threads at fairly considerable spacings.

Such weft threads are intended solely to facilitate handling of the woven sheets before calendering and play no part in the final behavior of the completed article, more particularly the pneumatic tires. The weft threads thus are expected to ensure that the cords remain equidistant during the operations which precede rubberizing, and, accordingly, so as not to initiate shearing stresses on the cords, they are made to be of relatively weak strength so that they can subsequently break.

In order that the weft threads play their part properly in the production of the woven sheets of cords in accordance with the above-described method, their length L, as shown in FIG. 1, should take into account the undulatory path A-B-C-D-E-F about the circles representing neighboring cords. It is quite apparent that the undulatory path taken by the weft threads is greater than the path of a straight line through the centers of the circles representing the adjacent cords.

If in accordance with such production of woven sheets of cords the weft threads are longer than the length L as defined above, the cords are not sufficiently securely held; moreover, if the weft threads are slightly shorter than the length L they exert a tensile force which is transmitted to the selvage cords. With such transmitted tensile force the cords tend to bunch up, thus, creating non-uniformity of density in the woven sheets of cords and sometimes the production of unwanted pockets during calendering. Of course, if the weft threads are substantially shorter than the length L they tend to break and the cords thus become displaced since they are no longer held by the weft threads. This, of course, gives calendered sheets of poor and generally unusable quality.

While various attempts have been made to eliminate these inherent disadvantages and deficiencies of previously employed process for the production of woven cords for pneumatic tires, such attempts have heretofore proved unsatisfactory. Thus, it has been attempted to reduce the above deficiencies and disadvantages by utilizing a conventional weaving method which makes it possible to give a certain amount of extension, but the results obtained are not at all adequate for sheets having a high cord density, especially if the cords are of a large diameter. Accordingly, such a process has not been advantageously utilized with success.

Similarly, while it has been proposed in the past to prepare a woven fabric re-enforcement for tires by the use of cords comprising a center core about which are wrapped spirally one or more yarns such woven sheets of cords so produced have not been found completely satisfactory in the production of pneumatic tires. Thus, for example, such a method of producing a woven fabric re-enforcement for tires is such as illustrated in U.S. Pat. No. 1,756,069 to Sawyer. Thus, in accordance with this patent wherein the tire contains woven sheets of cords having a core around which are spirally wrapped one or more yarns, under stresses the core of these cords will break but the cords will remain unbroken as they are able to stretch sufficiently to withstand high tension. Accordingly, under such circumstances a product results which due to the inability to control the elongation of the cords and or their spacing in the woven sheet, is non-uniform.

Such inherent disadvantages and deficiencies of previously employed processes for the production of woven sheets of cords, the woven sheets of cords per se and pneumatic tires containing the same have been overcome in accordance with the process, product, and finished article of the present invention. Thus, in accordance with the present invention it has been found possible to completely obviate the difficulties encountered by the prior art by employing a composite weft thread comprising a core with a cover thread, the cover thread being arranged around the core in helical manner, the pitch of the helix being dependent upon the length L so that the cords are held in an equidistant parallel relationship after a predetermined extension of the cover yarn.

Accordingly, it is a principle object of the present invention to provide a process for producing a woven sheet of cords, such woven sheet of cords so produced and pneumatic tires containing the same which process, product, and article have eliminated the inherent deficiencies and disadvantages associated with the prior art.

It is a further object of the present invention to provide such a process for the production of woven sheet of cords whereby it is possible to produce such a sheet of cords wherein the cords are maintained in an equidistant relationship and in a parallel relationship. A still further object of the present invention comprises a woven sheet of cords for use in pneumatic tires, such woven sheet of cords comprising equidistant cords arranged in a parallel relationship.

Yet a further object of the present invention comprises a process for producing a woven sheet of equidistant cords for pneumatic tires, and such woven sheet of cords wherein the cords are weaved as a warp with a composite weft thread composed of a core yarn of low mechanical strength and a helically wound cover yarn around the core yarn, the cover yarn being of such a length that during dipping, drawing, or winding up of the sheet of cords the cover yarn stretches a predetermined amount necessary to maintain the warp cords in the parallel equidistant relationship.

Still further objects and advantages of the novel process, product, and article of the present invention will become more apparent from the following more detailed description thereof.

In accordance with the present invention it has now been discovered that it is possible to produce a woven sheet of equidistant parallel cords for pneumatic tires in a manner which completely eliminates the inherent deficiencies and disadvantages of the prior art. Thus, in accordance with the present invention a process has been developed whereby a woven sheet of equidistant cords for pneumatic tires is produced by weaving such cords as a warp with a composite weft thread composed of a core yarn of low mechanical strength, such core yarn being capable of extending during processing of the woven sheets, and a helically wound cover yarn covering the core yarn, such cover yarn being of a length such that during dipping, drawing, or winding up or other manipulative steps of the sheet of cords the cover yarn stretches whereby the increased length of the yarn stretches whereby the increased length of the cover yarn is exactly equal to that which is necessary to maintain the warp cords in a parallel equidistant relationship. Preferably in accordance with the process of the present invention in the production of a novel woven sheet of equidistant cords for pneumatic tires the core yarn is of a sufficiently low mechanical strength so that the same will break during further processing conducted in the production of a pneumatic tire.

As indicated previously the weft yarns employed in accordance with the process, product, and article of the present invention are composed of a core portion having a covering yarn helically wound there about, the pitch of the helix being dependent upon the amount by which the weft yarns are to be extended during use. Thus, for example, the external thread or cover yarn may be wound around the core yarn such that the length of the same is for example 10–50 percent greater than that of the core yarn, the greater length of the cover yarn being that exactly necessary to maintain the cords in a parallel equidistant relationship after extension or breaking of the core yarn during the manipulative steps of tire production.

The composite weft yarn composed of the core yarn and the helically wound cover yarn is used for insertion in a warp of cords. During warping of the woven sheets of cords, i.e., cord warp yarn and composite weft yarns, the core of the composite weft yarns is broken and the helix comprising the cover yarn is stretched. Accordingly, by such an arrangement the weft thread or yarn can be elongated by that amount by which the cover yarn was longer than the core yarn of the composite thread. Thus, when the cover yarn is from 10–15 percent longer than the core of the composite weft yarn this allows an elongation of the weft thread of from 10–15 percent of the original length of the same. Again, the particular elongation allowed any particular weft thread in accordance with the present invention must be equal to that necessary to maintain the cords in a parallel equidistant relationship. Accordingly, the pitch of the helix and the length of the cover yarn is regulated so that the elongation accorded to the weft thread will be equal to that necessary to maintain the equidistant parallel relationship of the cords.

Thus, in accordance with the present invention by regulating the degree of elongation of the weft thread by the stretching of the cover yarn a predetermined amount it is possible to maintain the cords in the parallel equidistant relationship without subjecting them to stress and without enabling them to move about. This, of course, is a distinct advantage of the present invention.

The weft threads described above can be prepared from any of the conventional materials employed in the production of woven sheets of cords for pneumatic tires. Thus, for example, the helically wound cover yarn of the composite weft yarn which becomes the weft yarn of the woven sheet of cords produced in accordance with the present invention can comprise cotton, cellulose yarns, rayon, synthetic yarns such as polyamide and polyester yarns and glass yarns. The core thread of the composite weft can comprise any of the same textile materials and in addition can comprise a thread capable of disappearing by melting at a vulcanization temperature to which the pneumatic tire is subjected; such a material could be, for example, polyvinyl chloride.

It is also possible, of course, that the core thread can comprise a highly elastic textile material which in deforming yields to the external wound thread which is more inert.

It is only necessary, of course, that the core yarn of the composite weft yarn in accordance with the process, product, and article of the present invention be of a sufficiently low mechanical strength that the same break during the manipulative steps of tire production. This allows, of course, the cords of the woven sheet of cords to be held in a parallel equidistant relationship by the cover yarn of the composite weft yarn which due to the breaking of the core yarn constitutes the entirety of the weft of the fabric.

In accordance with the present invention it is, of course, obvious that the cord can comprise any conventional material generally employed in the production of cords for pneumatic tires. In this regard, the essence of the present invention relates to the manner w in which the sheet of cords is maintained in a parallel equidistant relationship so that the particular composition of the cords themselves is not critical. Accordingly, therefore, as pointed out previously, any conventional material generally employed in the production of cords can be employed in accordance with the present invention.

The present invention will now be described by reference to the drawing wherein.

In the various figures like numerals represent like elements.

Figure 1:
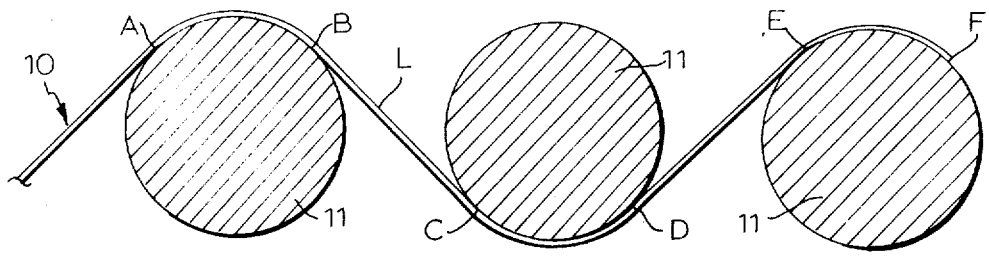
FIG. 1 is a diagrammatic view illustrating the position of the weave yarn according to the present invention.

FIG. 1 illustrates a weft yarn 10 passing over and under the successive warp yarns, i.e., cords 11, the weft yarn 10 being disposed to maintain the warp of cord yarns 11 in a predetermined spaced parallel relationship. This, of course, is the ultimate result desired in accordance with the present invention wherein the woven sheet of cords is maintained in a parallel equidistant relationship through the action of the weft yarn. As shown in FIG. 1 the weft yarn takes the undulatory path A-B-C-D-E-F with the length of the weft yarn L being such as to exactly maintain the cords 11 in the necessary parallel and equidistant relationship. This is achieved in accordance with the present invention by providing a composite weft yarn as shown in FIG. 2.

Figure 2:
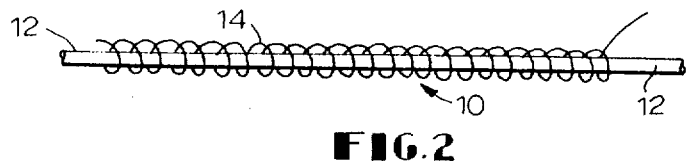
FIG. 2 is a detailed view of the composite weft yarn employed in accordance with the present invention.

As shown in FIG. 2, the composite weft thread employed in accordance with the present invention comprises a core 12 and a covering yarn 14 helically wound about the core yarn 12, the pitch of the helix being determined so that the length of the cover yarn 14 is exactly that which after extension maintains the cords 11 in a parallel equidistant relationship.

Figure 3:
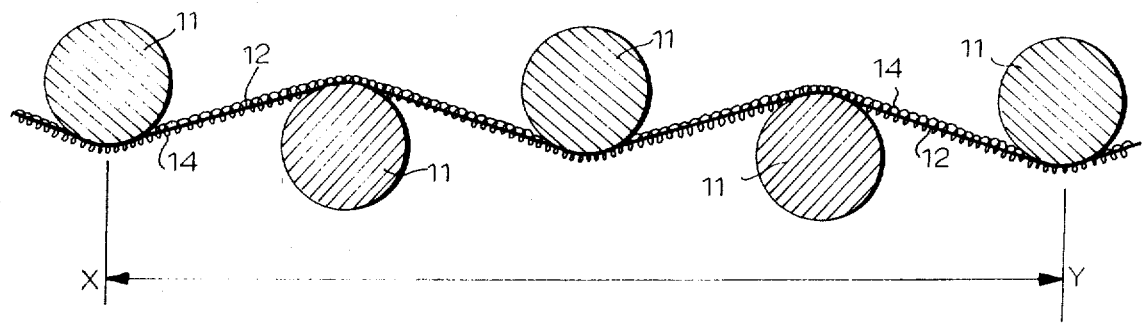
FIG. 3 is a diagrammatic representation of the cords and composite weft thread of the present invention prior to breakage of the core and elongation of the cover thread.

As shown in FIG. 3 the initial woven fabric produced for example by the shuttle of the weaving loom throwing a length of weft yarn about the cords is one wherein the cord 11 generally are found in two parallel planes with the composite weft yarn taking an undulating path therebetween. Thus, in FIG. 3 the relationship of the cords and composite weft yarn is shown after production of the woven sheet of cords but still prior to any rupturing or breaking of the core of the composite weft yarn. The relationship of the cords and weft yarn in the final product is shown in FIG. 4.

Figure 4:
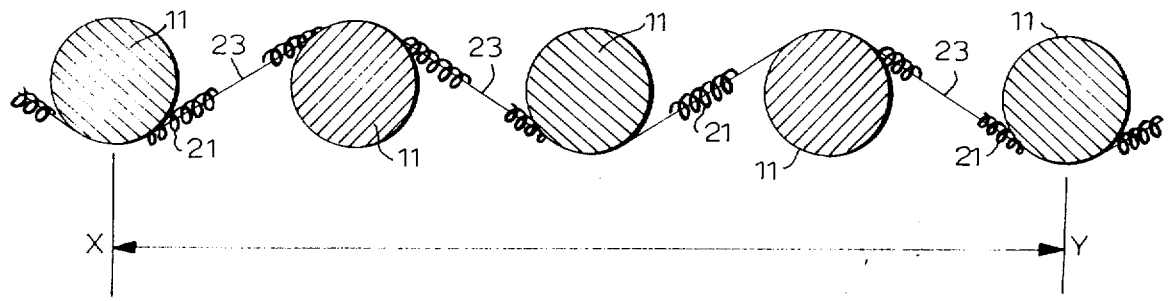
FIG. 4 is a representation of the woven sheet of cords of the present invention after breakage of the core of the composite weft thread and elongation of the cover yarn.

Thus FIG. 4 shows the relationship of the cords and the weft thread after further processing, that is, after drawing or dipping or winding under higher tension. In this regard, drawing or dipping or winding, that is, under higher tension the axis of the warp cords 11 is shifted into a common intermediate plane. This, of course, requires that the length of the weft thread must become greater, and therefore the core yarn breaks. As shown in FIG. 4 the stretched cover yarn 23 is exactly that length necessary to maintain the cords 11 in a parallel equidistant relationship, the broken core yarn 21 playing no part in the final product.

As can be seen from the above the sheet of cords embraced by the present invention does not practically change in dimensions from the original woven sheets of cords produced, for example, by the throwing of the composite weft thread about the cord. Thus, in accordance with the present invention the composite weft thread maintains the cords in a parallel equidistant relationship, that is, the length $x-y$ in FIG. 3 remains unchanged. Consequently, the woven sheet of cords or fabric produced in accordance with the present invention does not extend in the direction of the composite weft thread and its dimensions remain the same. This, of course, is a distinguishing feature of the process and product of the present invention and one which allows for the simplicity yet unusual efficiency of the woven sheet of cords produced in accordance with the process of the present invention.

As indicated previously the cords employed in accordance with the present invention can by any of those which are conventionally employed in the production of woven sheets of cords for pneumatic tires.

Again, it is pointed out that it is an important feature of the present invention that the fabric width, that is, the width of the woven sheet of cords produced in accordance with the present invention remains substantially unchanged in the direction of the composite weft threads, even during and after processing, wherein the core of the composite weft yarn is broken. Again, it is the essence of the present invention that the cover thread of the composite weft yarn is helically wound around the core in such a manner that the length of the cover yarn when extended is exactly equal to that length necessary to maintain the cords in the woven sheet of cords in a parallel equidistant relationship.

It is also to be noted that pneumatic tires containing the woven sheet of cords of the present invention are embraced by the present invention. In this regard, the pneumatic tires into which the woven sheet of cords can be incorporated are any of the conventional pneumatic tires containing a sheet of cords as a re-enforcing element. Here again, the woven sheet of cords of the present invention can be utilized in the same manner as any conventional sheet of cords generally employed in pneumatic tires, the advantages of the use of the sheet of cords of the present invention relating to the fact that a more uniform product is produced through the equidistant parallel relationship of the cords within the woven sheet.

The present invention will now be described by reference to the following examples. It is to be understood that such examples are presented for purposes of illustration only and the present invention is in no way to be deemed as limited thereto.

EXAMPLE I

A number 34 cotton yarn is covered with a similar material, i.e., a 34 cotton yarn by means of a conventional hollow spindle. The cotton yarn is covered with 550 covering turns per meter, the external thread being given a length which as 12 percent greater than the cotton yarn core.

Such a covered thread is used for insertion in a warp of 600 cords of polyamide threads, 840/3 × 3 denier per meter in width. By such a procedure a woven fabric is produced with the cords providing the warp and the weft comprising the composite thread of cotton core and externally and helically wound cover thread.

During further working with the woven sheet the core of the composite weft thread is broken and the helically wound cover thread is stretched, the weft thread being thus elongated by 12 percent. It is exactly this 12 percent elongation of the weft thread that is necessary to maintain the cords in a parallel equidistant relationship upon the shifting of the axis of the warp cords at the higher tension processing, i.e., drawing or dipping or winding of the woven sheet of cords.

Accordingly, a product is produced which, because of the fact that the cords are maintained in a parallel equidistant relationship by a regulation of the elongation of the cover thread of the composite weft thread, is more uniform than can be produced by methods utilized heretofore.

EXAMPLE II

Example I is repeated except the warp comprises 660 polyamide cords per meter in width. In order to maintain such cords in a parallel equidistant relationship in accordance with the present invention the cover yarn of the composite weft thread is helically wound so that the same when extended can be elongated by an amount of 16 percent. This elongation is exactly that necessary to maintain the cords of the woven sheet of cords in a parallel equidistant relationship in accordance with the present invention.

It can, therefore, be seen from the above that the process, product, and article of the present invention comprise a substantial improvement in cords employed for pneumatic tires. In this regard, as clearly pointed out above, by providing a composite weft yarn composed of a mechanically weak core and a helically wound cover yarn capable of extending to that amount necessary to maintain the cords in a parallel equidistant relationship it is possible to provide a completely uniform product free from the inherent deficiencies and disadvantages of previous prior art materials.

While the present invention has been described primarily with respect to the foregoing specific exemplification it is to be understood that the present invention is in no way deemed as limited thereto but must be construed as broadly as all or any equivalents thereof.

What is claimed is:

1. A method of preparing a woven fabric of parallel, equidistant cords for use in pneumatic tires comprising the steps of
weaving said cords as warp yarn with a composite weft yarn including a core yarn of low mechanical strength and a cover yarn helically wound around said core yarn, said cords being positioned in first and second planes after weaving with said composite weft yarn, and said core yarn having a length to maintain said cords in said first and second plane positions in parallel, equidistant relationship; and
processing said woven cords to position said cords in a single plane, said core yarn being broken during said processing step due to tensile stress caused by increased length requirement to maintain said cords in said parallel, equidistant relationship exceeding said low mechanical strength of said core yarn and said cover yarn being straightened during said processing step and said cover yarn having a predetermined straightened length exactly equal to the length required to maintain said cords in said single plane in parallel, equidistant relationship.

2. The method of claim 1 wherein said weaving step includes composing said core yarn of elastic material compatible with vulcanizing material employed in the production of a pneumatic tire.

3. A woven fabric of parallel, equidistant cords for pneumatic tires comprising a plurality of said cords arranged in parallel, equidistant relation as warp yarn, each (alternate ones) of said cords being disposed in (a) first and second spaced planes alternately lengthwise and weftwise (plane and the remaining ones of said cords being disposed in a second plane spaced from said first plane), and a weft yarn running transversely through said cords over and under (said alternate) consecutive ones of said cords (and under said remaining ones of said cords), said weft yarn including a core yarn having a length to maintain said cords in parallel, equidistant relation in said first and second planes and a cover yarn helically wound around said core yarn and having a straightened length exactly equal to the length required to maintain said cords in parallel, equidistant relation when said cords are forced into a single plane.

4. The woven fabric of cords of claim 3 wherein said core yarn is of a sufficiently low mechanical strength so that said core yarn breaks when said cords are forced into said single plane.

5. The woven sheet of cords of claim 3 wherein said core yarn is composed of elastic material compatible with vulcanizing material employed in the production of a pneumatic tire.

* * * * *